United States Patent [19]
Elwell

[11] 3,817,586
[45] June 18, 1974

[54] COMPACT TILTING PAD THRUST BEARING

[75] Inventor: Richard C. Elwell, Schenectady, N.Y.

[73] Assignee: General Electric Company, Schenectady, N.Y.

[22] Filed: Jan. 2, 1973

[21] Appl. No.: 320,491

[52] U.S. Cl. ............................................ 308/160
[51] Int. Cl. ............................................ F16c 17/06
[58] Field of Search ............................... 308/160, 9

[56] References Cited
UNITED STATES PATENTS

| | | | |
|---|---|---|---|
| 1,265,334 | 5/1918 | Howarth | 308/160 |
| 1,666,521 | 4/1928 | Allen | 308/160 |
| 3,056,635 | 10/1962 | Speigel | 308/160 |
| 3,586,401 | 6/1971 | Gravelle | 308/160 |

Primary Examiner—Manuel A. Antonakas
Assistant Examiner—S. Frank Susko, Jr.
Attorney, Agent, or Firm—John F. Ahern; James W. Mitchell

[57] ABSTRACT

In a machine casing having a rotating shaft supported therein, axial displacement of the shaft is limited by a tilting pad thrust bearing. Prior art thrust bearings of the tilting pad type are usually bulky because all components are contained within a so-called base ring. According to the present invention, the base ring is eliminated by an annular cage that circumferentially retains the bearing pads which are radially supported by the machine casing. Pivotal load equalizing and transferring links are also retained within the annular cage. Load transfer to the machine casing is accomplished through a relatively thin hardened ring between the pivotal links and machine casing. The ring also serves as a spacing member between the thrust bearing and machine casing.

5 Claims, 4 Drawing Figures

PATENTED JUN 18 1974 3,817,586

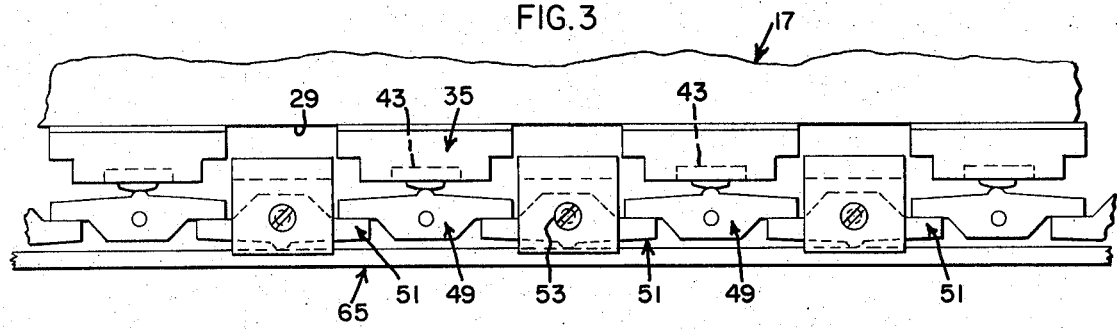
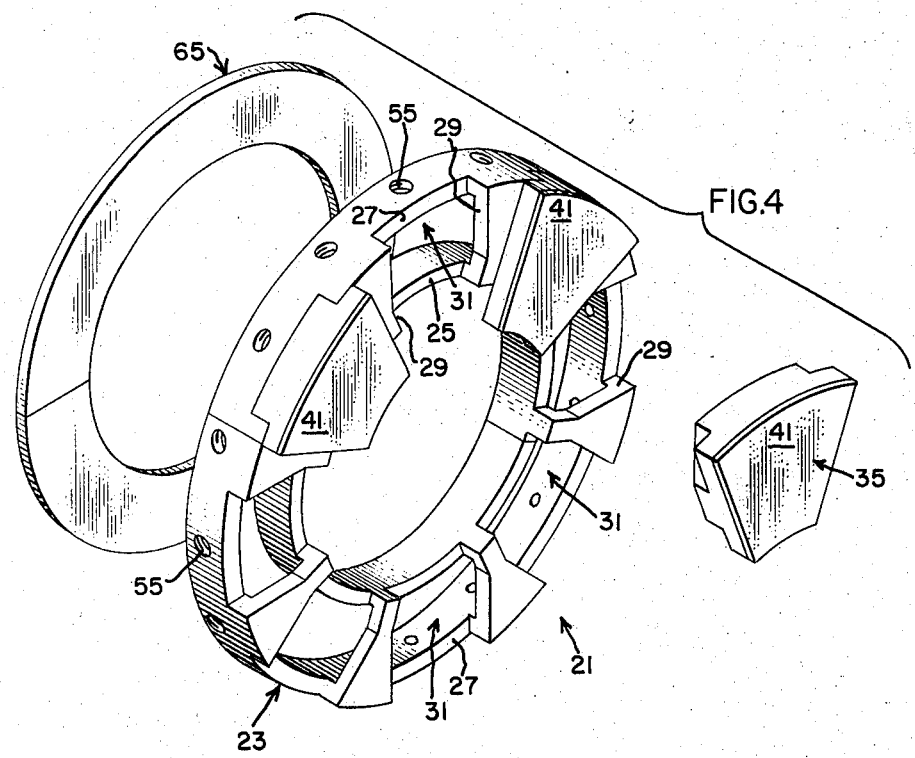

COMPACT TILTING PAD THRUST BEARING

BACKGROUND OF THE INVENTION

The present invention relates, in general, to thrust bearings for rotating machinery; and, in particular, to a compact tilting pad thrust bearing for use in said machinery.

Thrust bearings are used to limit axial displacement of a rotating machine shaft, and also to transfer axial loads from the shaft to the machine casing. Two types of thrust bearings are in general use to accomplish the aforementioned purpose. One type of thrust bearing is the "Tapered-Land" thrust bearing; the other is the tilting pad or "Kingsbury" thrust bearing, as it is sometimes called.

The "Tapered-Land" thrust bearing assembly ordinarily consists of a stationary annular bearing member having a radially segmented annular bearing surface thereon which is adapted to receive thrust from a generally flat mating annular bearing surface of a relatively rotatable thrust collar affixed to a rotating shaft thereby limiting the axial thrust of the rotating shaft. The segmented annular bearing surface of the stationary bearing member is formed of a plurality of equal sized, radially extending pads which project axially from the bearing member and are separated from each other by radially extending grooves in the bearing member. Oil is supplied through the grooves under pressure to the mating bearing surfaces of the assembly to provide a lubricating oil film therebetween during bearing operation. Each of the pads consists of a radially extending, generally flat land section at one end adjacent to an oil groove and a radially extending contiguous tapered section of fixed inclination which tapers axially inwardly from the land section to an oil groove at the opposite end of the pad. The land section of each pad may include about one quarter of the thrust surface of the pad to provide optimum bearing load carrying capacity during bearing operation and to carry the load during starting and stopping periods of bearing operation.

The thrust bearing surfaces of the land sections of all the pads in a "Tapered-Land" thrust bearing must lie in the same radial plane within close tolerances in order to provide proper alignment between the mating bearing surfaces of the assembly. Of course, this requires the use of very accurate machining techniques which are relatively expensive to perform. Also, the angle of inclination of the tapered sections of the pads are quite critical from a hydrodynamic standpoint to the operation of this type of bearing. Thus, the amount of taper on the tapered section of each pad must be very accurately controlled by the use of relatively expensive machining techniques to provide for optimum load carrying capacity for a specific designated bearing load condition. Hence, since the amount of taper in a "Tapered-Land" thrust bearing is fixed, optimum load carrying capacity of the wedge-like oil film, which is established between the tapered bearing surface of each pad and the mating flat bearing surface, is obtained only when the bearing is operating under the specific load condition for which it was designed.

However, the tapered sections of the pads in a "Tapered-Land" thrust bearing are susceptible to elastic and thermal deformation during bearing operation. Thus, these bearings are relatively difficult to design and do not always perform satisfactorily or meet the load carrying requirements in operation for which the bearing was designed. This is especially true when relatively small amounts of taper are used to provide increased bearing load carrying capacity, since a slight deformation may result in neutralizing the oil wedge or even inducing taper in the wrong direction. Moreover, since the tapered section of each pad is of fixed inclination in the same direction of rotation and the wedge-like oil film must be established in the direction of relative motion, a "Tapered-Land" thrust bearing assembly can be operated in only one direction of rotation.

The aforesaid fabrication, structural and operational disadvantages of "Tapered-Land" thrust bearings led to the development of the tilting pad or "Kingsbury" thrust bearing. In the tilting pad thrust bearing, the annular bearing surface, which corresponds to the bearing surfaces formed on the pads in a "Tapered-Land" thrust bearing, is formed by bearing surfaces on a plurality of individual pads, each of which is separately mounted on a base ring by pivoted leveling links so that the pads will tilt to form a plurality of wedge-shaped oil films between the bearing surfaces of the pads and the bearing surface of the thrust collar. There are no rigidly supported flat land sections forming a bearing surface in a tilting pad type bearing.

Thus, unlike the fixed tapered and land sections in a "Tapered-Land" bearing, the pads of a tilting pad bearing are capable of tilting independently to form an optimum oil film taper for any given combination of speed and thrust load which is applied thereto, thereby providing optimum load carrying capacity over a wide range of load conditions during bearing operation. Also, the thermal and elastic deformation of the pads is automatically compensated for in the tilting pad bearing construction, due to the inherent self-adjusting feature of the individually supported pads. Moreover, the pads may be readily mounted in a manner to tilt or deflect in either direction so that a tilting pad type thrust bearing may be satisfactorily operable in both directions of rotation. Other advantages inherent in the tilting pad design are greater acceptance of rotor to stator misalignment by the pivoted leveling links, looser manufacturing tolerances and an assembly less sensitive to dirt and foreign material.

However, the tilting pad bearing is comparatively bulky because of its base ring which performs the functions of (1) circumferentially spacing the bearing pads, (2) retaining pivotal members, (3) locking the assembly against rotation in the machine housing, (4) locating the pads at their radially inner diameters, (5) transmitting individual thrust loads from the pivotal members to the machine frame, and (6) routing lubricant to the bearing pads by integral fluid passages. The bulkiness of the bearing may be critical because it affects both the overall machine size and the shaft span.

It is therefore one object of the present invention to provide a compact tilting pad thrust bearing for a rotating machine.

It is another object of the present invention to eliminate the base ring found on the conventional tilting pad thrust bearing.

It is another object of the present invention to provide a tilt pad thrust bearing, which is essentially interchangeable with the "Tapered-Land" bearing in present machine design.

Other objects, advantages and features of the present invention will become apparent from the following description of a preferred embodiment thereof when taken in connection with the accompanying drawings.

BRIEF DESCRIPTION OF THE DRAWINGS

FIG. 3 is a developed plan view of a portion of the tilting pad thrust bearing illustrating the manner in which axial forces are transferred through the bearing; and FIG. 4 is an exploded assembly of a tilting pad thrust bearing without leveling links shown according to the present invention.

SUMMARY OF THE INVENTION

In a machine casing, housing a rotatable shaft including a thrust collar mounted thereon, axial thrust forces are transferred to the machine casing and then to the machine foundation through a tilting pad thrust bearing. An annular cage comprising a pair of concentric rings interconnected by radially extending spokes which define radial slots therebetween is provided. Bearing pads are circumferentially retained within the slots but are radially supported by the machine casing. Load transferring leveling links are retained between the concentric rings by circumferentially spaced, radially extending screws through at least one of the concentric rings. An annular ring on the side of the cage opposite the thrust collar and bearing pads is used as a transfer surface between the leveling links and machine casing. The present invention eliminates the usual bulky base ring construction found in prior art tilting pad thrust bearings.

DETAILED DESCRIPTION OF THE INVENTION

Figure 1:
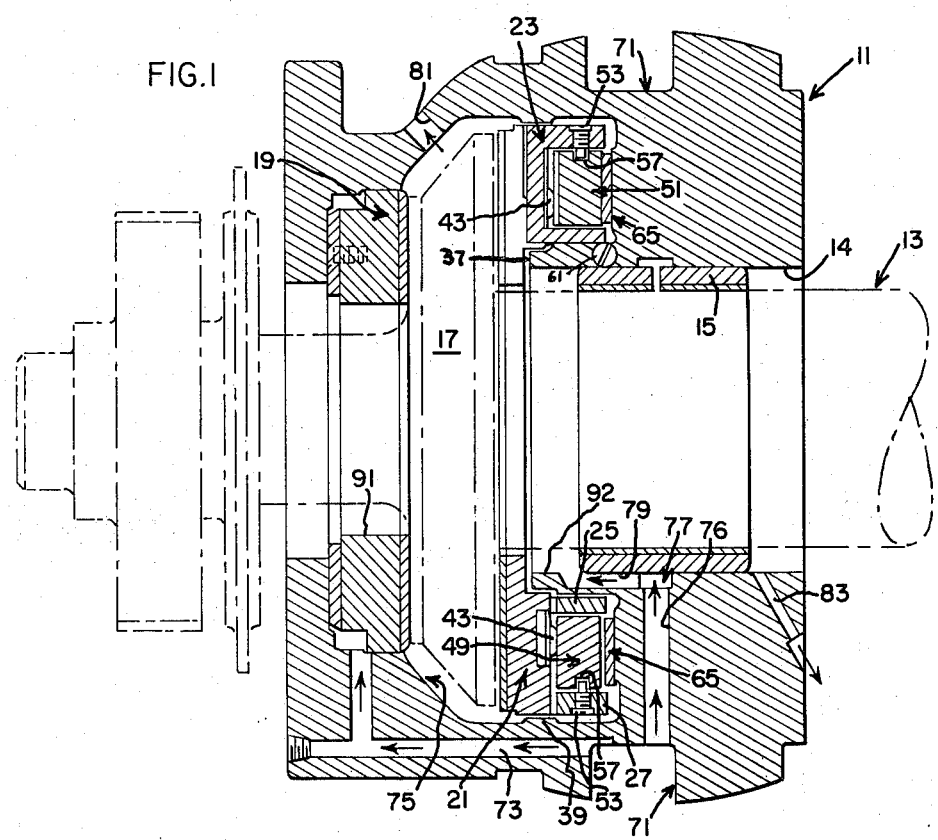
FIG. 1 is an elevation view of a tilting pad thrust bearing according to the present invention, including a portion of the machine casing, taken at I—I in FIG. 2.

Referring to the drawings, FIG. 1 shows an elevation section view of a part of a machine casing 11 having a rotatable shaft 13 extending through an axial bore 14 in the machine casing and supported by a journal bearing 15. A thrust collar 17 is fixed to the rotatable shaft.

The thrust collar limits the axial displacement of the shaft in cooperation with a negative thrust bearing 19 and a positive thrust bearing 21. The negative thrust bearing may be of the "Tapered-Land" type or the tilting pad type; whereas, the positive thrust bearing, which forms the basis of this invention, is of the tilting pad or Kingsbury type.

Figure 2:
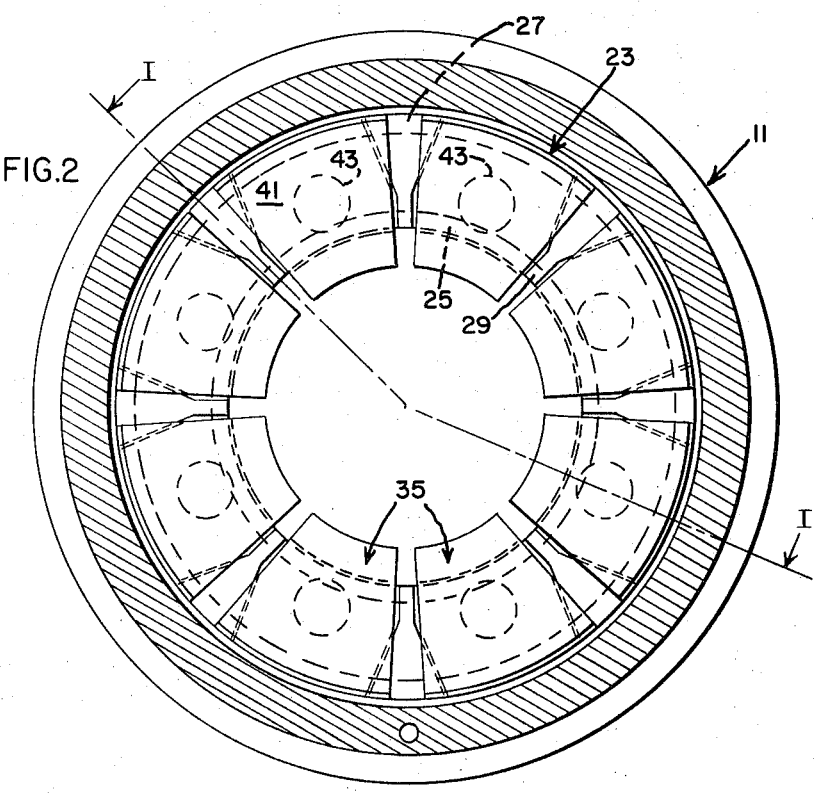
FIG. 2 is an end elevation view of the present invention with bearing pads in place.

As shown in FIGS. 2, 3 and 4, the positive thrust bearing includes an annular cage 23 having an inner concentric ring 25 and an outer concentric ring 27. The pair of concentric rings are connected by radially extending spokes 29 which project axially from the connected rings to form radially extending slots 31 between each pair of spokes.

A bearing pad, or shoe, assembly 35 is positioned into each one of the radial slots and is circumferentially retained by each pair of adjacent spokes. The pads are permitted a limited pivotal movement within the slot and are supported in the radial direction by inner and outer flange rings 37 and 39, respectively, formed in the machine casing. Thus, the particular construction of the thrust bearing, according to the present invention, allows the bearing pad assembly to be supported radially by the machine casing rather than the thrust bearing itself. The bearing pad assembly is comprised of an arcuate pad including a bearing surface 41 which may be formed of a babbitt liner and a pivotal button 43 which is shown partially in phantom in FIG. 3 and in the section in FIG. 1. This construction of the bearing pad assembly is commonly used in prior art tilting pad thrust bearings. Still viewing FIG. 3, the remaining portion of the annular cage includes upper pivot means or leveling links 49 and lower pivot means or leveling links 51 which are so-called relative to their position with respect to the pivotal buttons of the bearing pad assemblies. Those pivot means in direct contact with the pivotal buttons of the bearing pad assemblies are upper pivot means while those pivot means indirectly influenced by the pivotal bearing pad buttons are lower pivot means. Each pivot means or leveling link is held in place by a radial screw 53 which is retained in the annular cage outer ring 27 through threaded holes 55, and, blind holes 57 in each pivot means. Obviously the pivot means could be retained by means of radial holes in the inner ring of the annular cage with radial screws therethrough or by means of radially extending pins through both the inner and outer concentric rings of the annular cage. The operation of this construction will be later described. The pivot means or leveling links are complementary links pivotally held within the concentric rings of the annular cage.

As illustrated in FIG. 1, the thrust bearing is prevented from rotating relative to the machine casing by stop means or screws 61 (only one shown) tangent to the journal bearing and inner ring 25.

A load transferring ring or shim 65 is interposed between the lower pivot means and the machine casing. The ring 65 may be keyed (not shown) to the annular cage to prevent relative rotation with respect to the machine casing. The ring is relatively thin, but made of a hardened metal for transferring loads from the lower pivot means to the machine casing. The ring, besides being a load transferring member, is also a positioning member useful in assuring proper spacing between the thrust collar and the bearing surface of the annular cage comprised of the individual circumferentially arrayed bearing pad assemblies.

Lubrication of all bearing surfaces may be accomplished as shown in FIG. 1. An annular oil groove 71, in the machine casing is supplied with oil, under pressure, a portion of which passes through passage 73 wherefrom it is distributed to the negative thrust bearing 19 and is, in the usual manner, distributed to the bearing face and into cavities 75 and 91 in the machine casing. The remaining bearing oil is distributed to passage 76 and to annulus 77 wherefrom some of it is distributed to the journal bearing 15. Some of the oil in annulus 77 is further distributed through oil dam 79 to cavity 92; and, thereafter to the positive thrust bearing surface wherefrom it passes into cavity 75. Oil from cavity 75 is drained through passage 81 while oil from the journal bearing is drained through passage 83.

The operation and construction of the present invention may be summarized as follows. The machine casing and annular cage are constructed along a horizontal joint and the annular cage is slipped into the machine casing a half at a time. The pivot means, upper and lower, often referred to as leveling links, are already positioned within the concentric rings, as described, by the radial screws 53. As the annular cage is positioned into the lower casing, each bearing pad assembly is positioned in a raised slot between the spokes and concentric rings. The annular cage is rotated into the casing as each bearing pad assembly is positioned because the bearing pad is supported in the radial direction by the machine casing. After the annular cage is positioned in the bottom half of the casing, the lower half of ring 65 is placed in the machine casing so that proper axial clearances are provided between the thrust collar and the bearing surface. Thereafter the upper portion of the machine casing is assembled and the two machine casing halves are joined. Operation of the device is best seen in connection with FIG. 3. The bearing surface immediately adjacent the thrust collar 17 and formed by bearing pad assemblies 35 is subject to axial thrusts and therefore loads by the collar. The bearing surface is lubricated with oil and thrust forces are equalized throughout the bearing through bearing pad assemblies 35 and leveling links 49 and 51 operating under the aforementioned tilting pad or Kingsbury principle. Finally the axial thrusts are transferred to the ring 65 and then to the machine frame and foundation. Thus, the present construction obviates the need for the prior art "base ring" by providing a smaller annular cage which positions but does not support the bearing pad assemblies and by the ring 65 which acts as a loading member and spacer rather than a retainer member as found in the prior art.

While there is shown what is considered to be at present the preferred embodiment of the invention, it is, of course, understood that various other modifications may be made therein and it is intended to cover in the appended claims all such modifications as fall within the true spirit and scope of the invention.

What is claimed is:

1. A thrust bearing for axially constraining a rotatable shaft within a machine casing, said shaft including a thrust collar rotatable therewith; and, said thrust bearing comprising:
   a non-rotatable annular cage having a pair of spaced apart concentric rings said concentric rings including a radially outer concentric ring supported from a radially inner concentric ring by a number of radially extending spokes defining radially extending slots therebetween;
   a pivotal bearing pad assembly radially insertable into each slot and constrained in the circumferential direction by said spokes, said pads forming a raised annular bearing surface adjacent said thrust collar; each pad assembly including at least one pivot point on the side opposite the bearing surface forming an annular array of pivot points;
   pivotally fixed leveling links, disposed within said concentric rings cooperating with said annular array of pivot points; and,
   a separate, relatively thin, hardened ring disposed in said machine casing adjacent said leveling links between said annular cage and said machine casing whereby axial thrusts to said bearing surface are transmitted directly through said leveling links and hardened ring to said machine casing.

2. The thrust bearing recited in claim 1 wherein said leveling links include upper and lower leveling links; said upper leveling links contacting the pivot points on said bearing pad assemblies and said lower links contacting said upper links and said hardened ring.

3. The thrust bearing recited in claim 1 wherein each bearing pad assembly is supported in the radial direction by the machine casing.

4. The thrust bearing recited in claim 1 wherein each leveling link is pivotally secured within the annular cage by a radially extending pin passing through at least one of said concentric rings.

5. The thrust bearing recited in claim 1 wherein rotation of the annular cage is prevented by stop means tangential to the annular cage in the machine casing.

* * * * *